(12) United States Patent
Fedorikhin et al.

US011655734B1

(10) Patent No.: US 11,655,734 B1
(45) Date of Patent: May 23, 2023

(54) INTEGRATED E-MACHINE CONTROLLER FOR TURBOMACHINE WITH THERMALLY DE-COUPLED FASTENER ARRANGEMENT

(71) Applicant: Garrett Transportation I Inc, Torrance, CA (US)

(72) Inventors: Valeriy Fedorikhin, Redondo Beach, CA (US); Frederic Simon, Chaumousey (FR); Youssef Kamal, Thaon-les-Vosge (FR)

(73) Assignee: GARRETT TRANSPORTATION I INC, Torrance, CA (US)

( * ) Notice: Subject to any disclaimer, the term of this patent is extended or adjusted under 35 U.S.C. 154(b) by 0 days.

(21) Appl. No.: 17/643,421

(22) Filed: Dec. 9, 2021

(51) Int. Cl.
*F01D 25/28* (2006.01)
*F01D 15/10* (2006.01)
*F01D 25/12* (2006.01)

(52) U.S. Cl.
CPC .............. *F01D 25/28* (2013.01); *F01D 15/10* (2013.01); *F01D 25/12* (2013.01); *F05D 2220/40* (2013.01); *F05D 2220/76* (2013.01); *F05D 2260/231* (2013.01); *F05D 2260/31* (2013.01)

(58) Field of Classification Search
CPC .......... F01D 25/28; F01D 15/10; F01D 25/12; F01D 25/14; F05D 2220/40; F05D 2220/76; F05D 2260/231; F05D 2260/31; F05D 2260/20; F05D 2250/70; F02B 39/16; F02B 39/10; H05K 1/0207; H05K 1/0209; H05K 1/183; H05K 2201/064; H05K 2201/10166; H05K 3/0061; H05K 7/1432; H05K 7/209; H05K 7/20927
See application file for complete search history.

(56) References Cited

U.S. PATENT DOCUMENTS

| 7,352,077 | B2* | 4/2008 | Shibui | F01D 15/10 290/52 |
|---|---|---|---|---|
| 10,462,937 | B1* | 10/2019 | Louco | H05K 1/183 |
| 2018/0045108 | A1* | 2/2018 | Baeuerle | F02B 39/10 |
| 2019/0195212 | A1* | 6/2019 | Sasaki | H02K 5/10 |
| 2019/0368413 | A1* | 12/2019 | Carter | H05K 7/20872 |

(Continued)

FOREIGN PATENT DOCUMENTS

EP 2305981 B1 4/2013
FR 3053756 A1 1/2018

*Primary Examiner* — Jesse S Bogue
(74) *Attorney, Agent, or Firm* — Lorenz & Kopf, LLP (57) ABSTRACT

A turbomachine includes a housing and a rotating group that is supported for rotation about an axis of rotation within the housing. The turbomachine also includes a turbomachine stage including a wheel of the rotating group supported within a turbomachine housing of the housing. The turbomachine further includes an e-machine section including an e-machine that is housed within an e-machine housing of the housing. The e-machine is operably coupled to the rotating group and configured to operate as at least one of a motor and a generator. Moreover, the turbomachine includes an integrated controller that extends in a circumferential direction about the axis of rotation. The integrated controller is configured for controlling the e-machine. Additionally, the turbomachine includes a thermally decoupled fastener arrangement that attaches the integrated controller to the e-machine housing. The fastener arrangement thermally decouples the integrated controller from the turbomachine stage.

20 Claims, 5 Drawing Sheets

(56) References Cited

U.S. PATENT DOCUMENTS

| | | | | |
|---|---|---|---|---|
| 2021/0029817 A1* | 1/2021 | Louco | ............... | H05K 1/0203 |
| 2021/0087967 A1* | 3/2021 | Louco | ................. | F02B 37/10 |
| 2022/0412374 A1* | 12/2022 | Fedorikhin | ........... | H02K 11/33 |

* cited by examiner

INTEGRATED E-MACHINE CONTROLLER FOR TURBOMACHINE WITH THERMALLY DE-COUPLED FASTENER ARRANGEMENT

TECHNICAL FIELD

The present disclosure generally relates to a turbomachine and, more particularly, relates to an integrated e-machine controller for a turbomachine with a thermally de-coupled fastener arrangement.

BACKGROUND

Some turbomachines include an e-machine, such as an electric motor or generator. More specifically, some turbochargers, superchargers, or other fluid compression devices can include an electric motor that is operably coupled to the same shaft that supports a compressor wheel, turbine wheel, etc. The electric motor may drivingly rotate the shaft, for example, to assist a turbine stage of the device. In further embodiments, the e-machine may be configured as an electric generator, which converts mechanical energy of the rotating shaft into electric energy.

These devices may also include a controller that, for example, controls operation of the e-machine. More specifically, the control system may control the torque, speed, or other operating parameters of the e-machine and, as such, control operating parameters of the rotating group of the turbomachine.

However, conventional controllers of such turbomachines suffer from various deficiencies. These controllers can be heavy and/or bulky. Furthermore, thermal conditions proximate the controller may negatively affect operations. In addition, manufacture and assembly of conventional control systems can be difficult, time consuming, or otherwise inefficient.

Thus, it is desirable to provide a compact and lightweight turbomachine that includes an e-machine and an associated controller. Furthermore, it is desirable to provide a controller for such a turbomachine that operates efficiently and effectively, even in high-temperature environments. It is also desirable to provide improvements that increase manufacturing efficiency for such a turbomachine. Other desirable features and characteristics of the present disclosure will become apparent from the subsequent detailed description and the appended claims, taken in conjunction with the accompanying drawings and this background discussion.

BRIEF SUMMARY

In one embodiment, a turbomachine is disclosed that includes a housing and a rotating group that is supported for rotation about an axis of rotation within the housing. The turbomachine also includes a turbomachine stage including a wheel of the rotating group supported within a turbomachine housing of the housing. The turbomachine further includes an e-machine section including an e-machine that is housed within an e-machine housing of the housing. The e-machine is operably coupled to the rotating group and configured to operate as at least one of a motor and a generator. Moreover, the turbomachine includes an integrated controller that extends in a circumferential direction about the axis of rotation. The integrated controller is configured for controlling the e-machine. Additionally, the turbomachine includes a thermally decoupled fastener arrangement that attaches the integrated controller to the e-machine housing. The fastener arrangement thermally decouples the integrated controller from the turbomachine stage.

In another embodiment, a method of manufacturing a turbomachine is disclosed. The method includes supporting a rotating group for rotation about an axis of rotation within a housing. The method includes defining a turbomachine stage that includes a wheel of the rotating group supported within a turbomachine housing of the housing. The method also includes housing an e-machine within an e-machine housing of the housing to define an e-machine section, including operatively coupling the e-machine to the rotating group for operation as at least one of a motor and a generator. Moreover, the method includes extending an integrated controller in a circumferential direction about the axis of rotation, wherein the integrated controller is configured for controlling the e-machine. Additionally, the method includes attaching the integrated controller to the e-machine housing with a thermally decoupled fastener arrangement. The fastener arrangement thermally decouples the integrated controller from the turbomachine stage.

In a further embodiment, a turbocharger is disclosed that includes a housing and a rotating group that is supported for rotation about an axis of rotation within the housing. The turbocharger further includes a compressor stage with a compressor wheel of the rotating group that is supported within a compressor housing of the housing. Furthermore, the turbocharger includes a turbine stage with a turbine wheel of the rotating group that is supported within turbine housing of the housing. The turbocharger further includes an electric motor section including an electric motor that is housed within an e-machine housing of the housing and that is operably coupled to the rotating group. The turbocharger further includes an integrated controller that extends in a circumferential direction about the axis of rotation. The integrated controller is configured for controlling the electric motor. Moreover, the turbocharger includes a thermally decoupled fastener arrangement that attaches the integrated controller to the e-machine housing. The fastener arrangement thermally decouples the integrated controller from the turbine stage.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include an improved turbomachine with an e-machine, such as an electric motor. The turbomachine further includes a controller that is integrated and packaged compactly with the other components of the turbomachine. The turbomachine includes a fastener arrangement that attaches the controller to one or more other components of the turbomachine, and the fastener arrangement thermally isolates (i.e., thermally decouples) one or more components of the controller from other high-temperature components during operation. These features may limit and/or prevent heat from transferring from the high-temperature components to the controller via the thermally conductive components. Accordingly, the controller may operate within preferred thermal conditions.

In some embodiments, the turbomachine may include an electric motor and/or electric generator and at least one turbomachine stage. For example, the turbomachine of the present disclosure may comprise a turbocharger with a compressor stage, a turbine stage, and an e-machine section (e.g., a motor section). This turbomachine may also include an e-machine controller (i.e., control system, control assembly, etc.) for controlling the e-machine. The turbocharger may be incorporated in an engine system, a fuel cell system, or other system. The e-machine controller may be integrated within the turbomachine. For example, the e-machine controller may be shaped so as to extend about an axis of rotation of the rotating group of the turbocharger. The turbocharger may also include a fastener arrangement with fasteners that attach a housing of the e-machine to a support structure of the controller. More specifically, in some embodiments, the fasteners may attach the e-machine housing to a fluid-cooled support structure (e.g., a coolant core) of the controller. Despite close proximity to the turbine stage, the fastener arrangement may thermally de-couple the fasteners from the turbine stage. For example, in the fastener arrangement, the fasteners may be received in respective apertures of the e-machine housing, and fasteners may be seated within the apertures, recessed and separated away at a distance from the turbine stage. Furthermore, the fastener arrangement may include thermally insulative heatshield coverings that cover over the fasteners, close off the apertures, and/or provide a thermal shield between the turbine stage and the fasteners. Accordingly, the fasteners are unlikely to receive heat from the turbine stage that could otherwise transfer into the controller. Thus, the controller is more likely to operate within desired thermal conditions.

Figure 1:
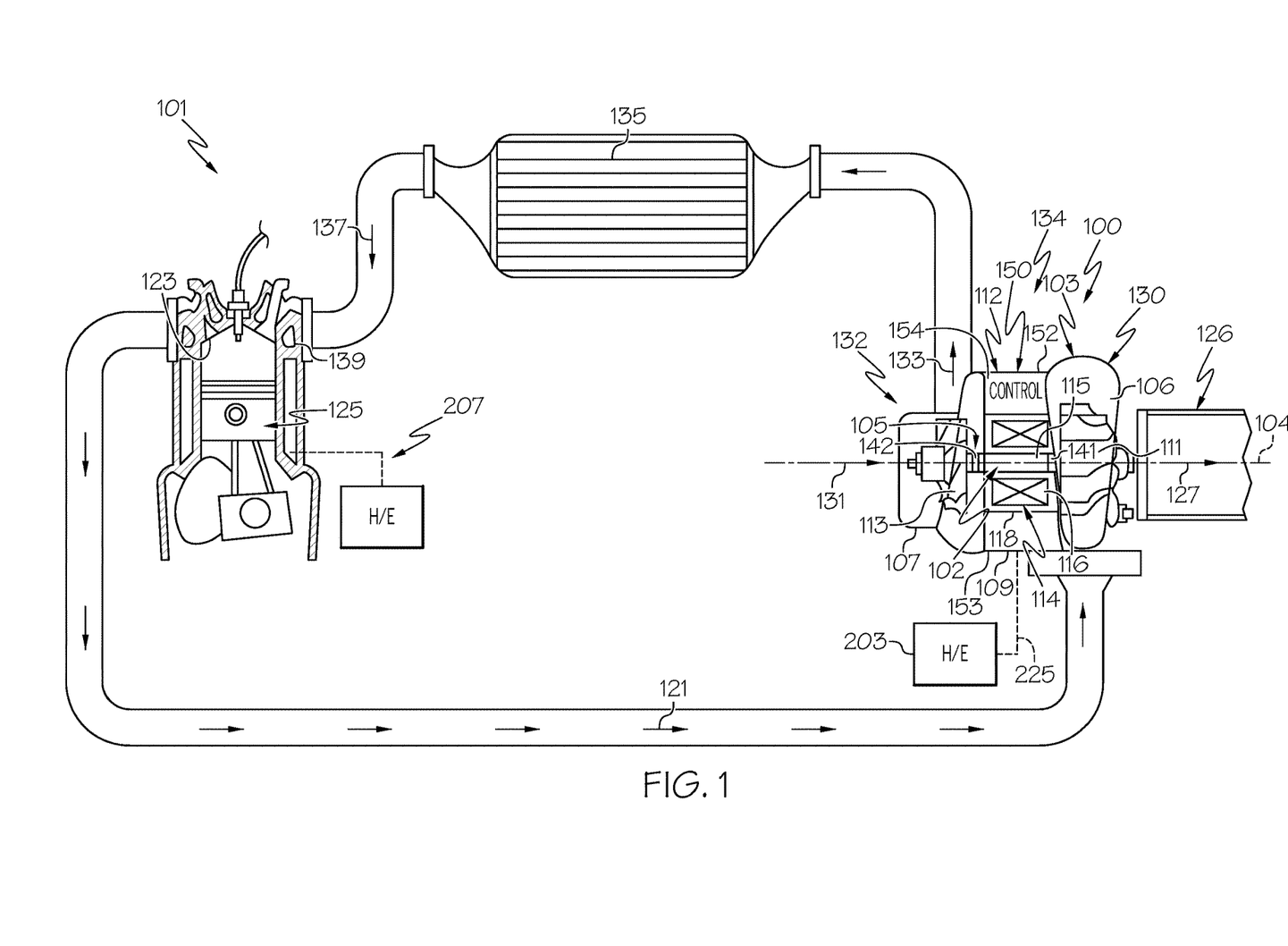
FIG. 1 is a schematic illustration of an engine system with a turbomachine that includes an integrated controller according to example embodiments of the present disclosure.

FIG. 1 is a schematic view of an example turbomachine, such as a turbocharger 100 that is incorporated within an engine system 101 and that includes one or more features of the present disclosure. It will be appreciated that the turbocharger 100 could be another turbomachine (e.g., a supercharger, a turbine-less compressor device, etc.) in additional embodiments of the present disclosure. Furthermore, the turbomachine of the present disclosure may be incorporated into a number of systems other than an engine system without departing from the scope of the present disclosure. For example, the turbomachine of the present disclosure may be incorporated within a fuel cell system for compressing air that is fed to a fuel cell stack, or the turbomachine may be incorporated within another system without departing from the scope of the present disclosure.

Generally, the turbocharger 100 may include a housing 103 and a rotating group 102, which is supported within the housing 103 for rotation about an axis 104 by a bearing system 105. The bearing system 105 may be of any suitable type, such as a roller-element bearing or an air bearing system.

As shown in the illustrated embodiment, the housing 103 may include a turbine housing 106, a compressor housing 107, and an intermediate housing 109. The intermediate housing 109 may be disposed axially between the turbine and compressor housings 106, 107.

Additionally, the rotating group 102 may include components of at least one turbomachine stage as well as an e-machine section. As shown, the rotating group 102, generally, may include a turbine wheel 111 of a turbine stage 130, a compressor wheel 113 of a compressor stage 132, and a shaft 115 that extends through the turbine stage 130, the compressor wheel 113 and through an e-machine section 112 disposed therebetween. The turbine wheel 111 is located substantially within the turbine housing 106 to cooperatively define the turbine stage 130. The compressor wheel 113 is located substantially within the compressor housing 107 to cooperatively define the compressor stage 132. The shaft 115 extends along the axis of rotation 104, through the intermediate housing 109, to connect the turbine wheel 111 to the compressor wheel 113. Accordingly, the turbine wheel 111 and the compressor wheel 113 may rotate together as a unit about the axis 104.

The turbine stage 130 may be cooperatively defined by the turbine housing 106 and the turbine wheel 111. The turbine stage 130 may be configured to circumferentially receive a high-pressure and high-temperature exhaust gas stream 121 from an engine, specifically, from an exhaust manifold 123 of an internal combustion engine 125. The turbine wheel 111 and, thus, the other components of the rotating group 102 are driven in rotation around the axis 104 by the high-pressure and high-temperature exhaust gas stream 121, which becomes a lower-pressure and lower-temperature exhaust gas stream 127 that is released into a downstream exhaust pipe 126.

The compressor stage 132 cooperatively defined by the compressor housing 107 and compressor wheel 113 may be operable to be driven in rotation by the exhaust-gas driven turbine wheel 111. The compressor stage 132 may be configured to compress received input air 131 (e.g., ambient air, or already-pressurized air from a previous-stage in a multi-stage compressor) into a pressurized airstream 133 that is ejected circumferentially from the compressor housing 107. The compressor housing 107 may have a shape (e.g., a volute shape or otherwise) configured to direct and pressurize the air blown from the compressor wheel 113. Due to the compression process, the pressurized air stream is characterized by an increased temperature, over that of the input air 131.

The pressurized airstream 133 may be channeled through an air cooler 135 (i.e., intercooler), such as a convectively cooled charge air cooler. The air cooler 135 may be configured to dissipate heat from the pressurized airstream 133, increasing its density. The resulting cooled and pressurized output air stream 137 is channeled into an intake manifold 139 of the internal combustion engine 125, or alternatively, into a subsequent-stage, in-series compressor.

Furthermore, the turbocharger 100 may include the e-machine section 112. The e-machine section 112 may be cooperatively defined by the intermediate housing 109 and by an e-machine 114 housed therein. The shaft 115 may extend through the e-machine section 112, and the e-machine 114 may be operably coupled thereto. The e-machine 114 may be an electric motor, an electric generator, or a combination of both. Thus, the e-machine 114 may be configured as a motor to convert electrical energy to mechanical (rotational) energy of the shaft 115 for driving the rotating group 102. Furthermore, the e-machine 114 may be configured as a generator to convert mechanical energy of the shaft 115 to electrical energy that is stored in a battery, etc. As stated, the e-machine 114 may be configured as a combination motor/generator, and the e-machine 114 may be configured to switch functionality between motor and generator modes in some embodiments as well.

For purposes of discussion, the e-machine 114 will be referred to as a motor 116. The motor 116 may include a rotor member (e.g., a plurality of permanent magnets) that are supported on the shaft 115 so as to rotate with the rotating group 102. The motor 116 may also include a stator member (e.g., a plurality of windings, etc.) that is housed and supported within the intermediate housing 109. In some embodiments, the motor 116 may be disposed axially between a first bearing 141 and a second bearing 142 of the bearing system 105. Also, the motor 116 may be housed by a motor housing 118 of the intermediate housing 109. The motor housing 118 may be a thin-walled or shell-like housing that encases the stator member of the motor 116. The motor housing 118 may also encircle the axis 104, and the shaft 115 may extend therethrough.

Furthermore, the turbocharger 100 may include an integrated controller 150. The integrated controller 150 may generally include a controller housing 152 and a number of internal components 154 (e.g., circuitry, electronic components, cooling components, support structures, etc.) housed within the controller housing 152. The integrated controller 150 may control various functions. For example, the integrated controller 150 may control the motor 116 to thereby control certain parameters (torque, angular speed, START/STOP, acceleration, etc.) of the rotating group 102. The integrated controller 150 may also be in communication with a battery, an electrical control unit (ECU), or other components of the respective vehicle in some embodiments. More specifically, the integrated controller 150 may receive DC power from a vehicle battery, and the integrated controller 150 may convert the power to AC power for controlling the motor 116. In additional embodiments wherein the e-machine 114 is a combination motor/generator, the integrated controller 150 may operate to switch the e-machine 114 between its motor and generator functionality.

Figure 2:
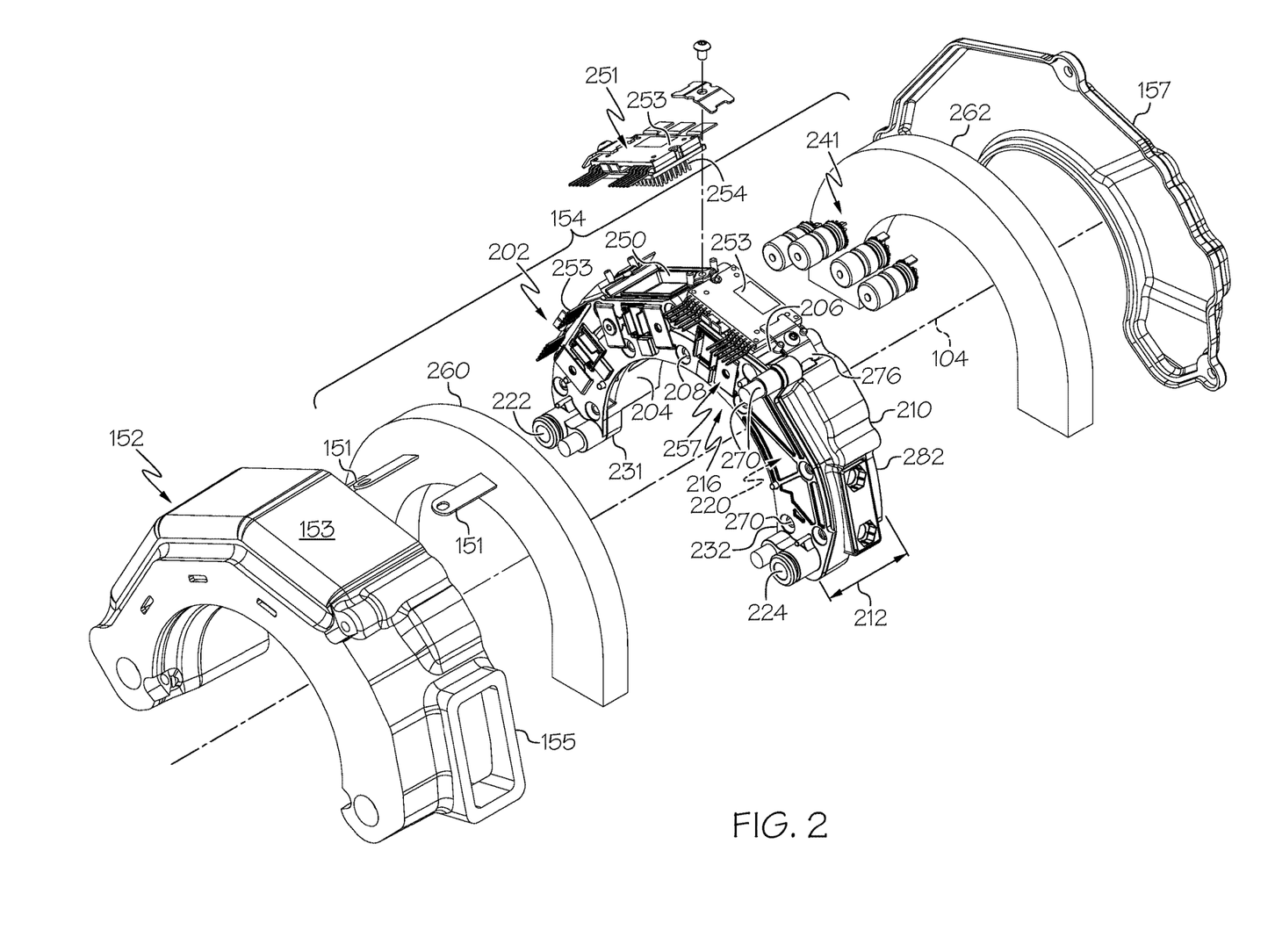
FIG. 2 is an exploded isometric view of the integrated controller according to example embodiments of the present disclosure.
Figure 3:
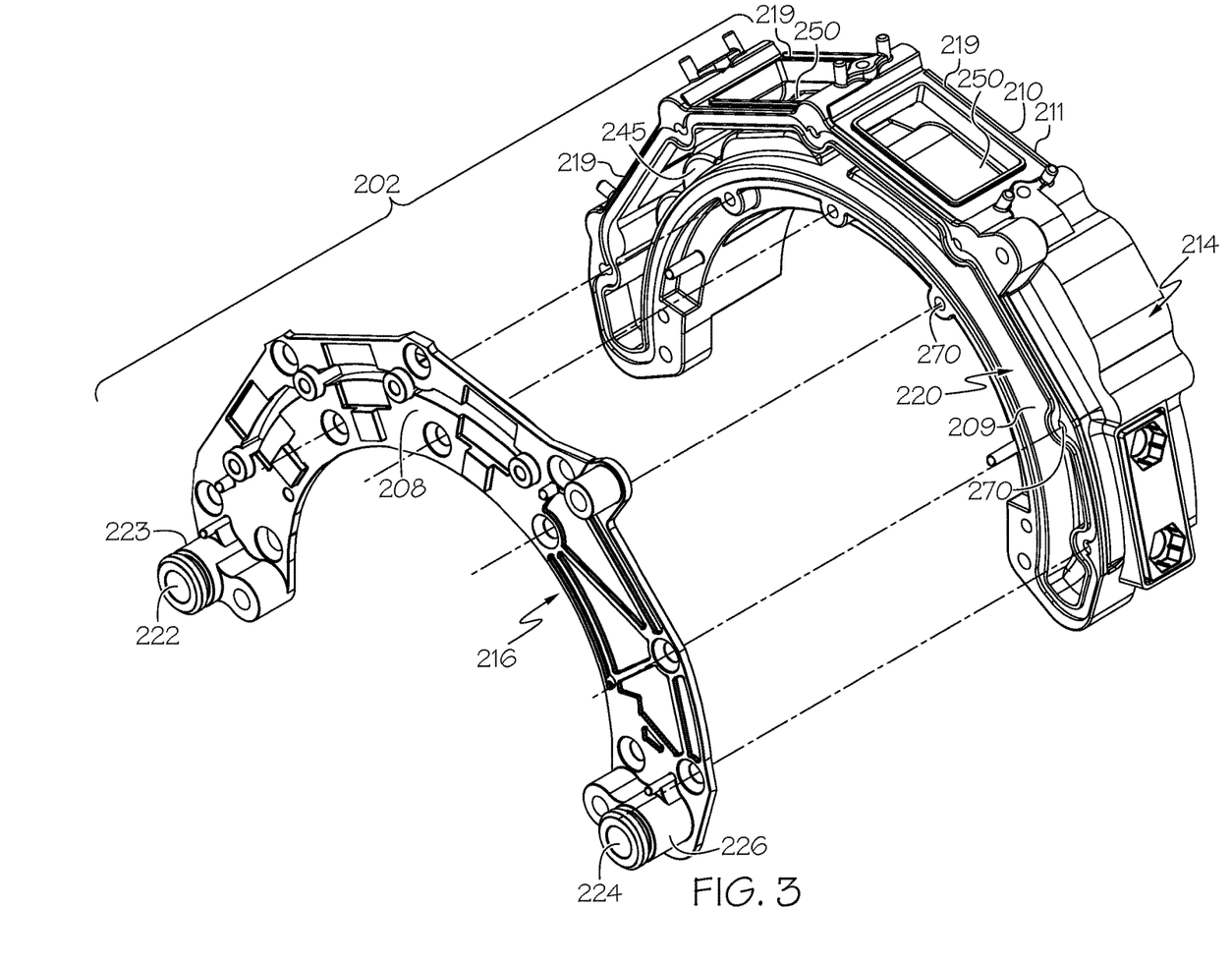
FIG. 3 is an exploded isometric view of a coolant core of the integrated controller of FIG. 2 from a first perspective.
Figure 4:
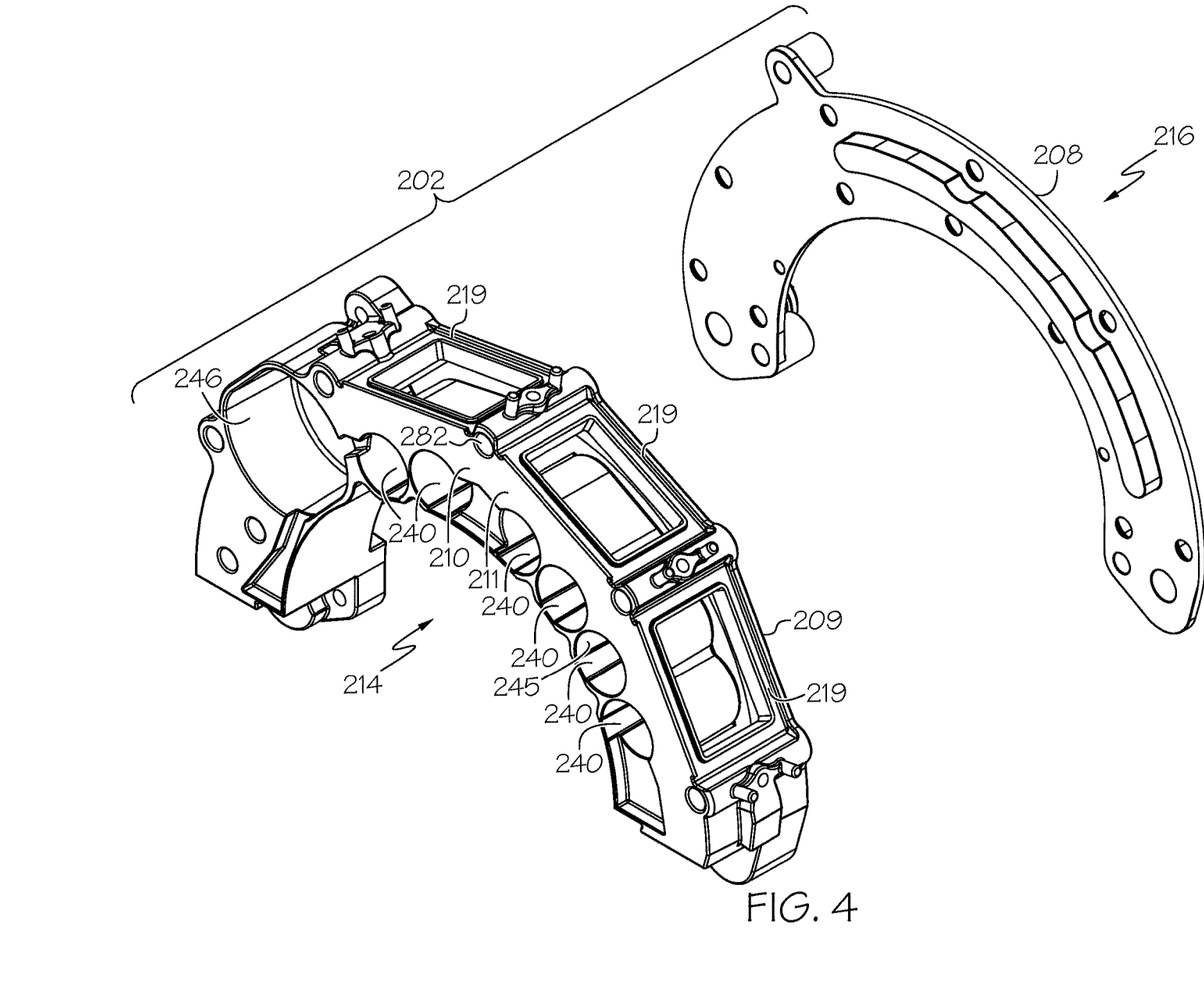
FIG. 4 is an exploded isometric view of a coolant core of the integrated controller of FIG. 2 from a second perspective.

In some embodiments, the integrated controller 150 may be disposed axially between the compressor stage 132 and the turbine stage 130 of the turbocharger 100 with respect to the axis 104. Thus, as illustrated, the integrated controller 150 may be disposed and may be integrated proximate the motor 116. For example, as shown in the illustrated embodiment, the integrated controller 150 may be disposed on and may be arranged radially over the motor housing 118. More specifically, the integrated controller 150 may extend and wrap about the axis 104 to cover over the motor 116 such that the motor 116 is disposed radially between the shaft 115 and the integrated controller 150. The integrated controller 150 may also extend about the axis 104 in the circumferential direction and may cover over, overlap, and wrap over at least part of the motor housing 118. In some embodiments, the integrated controller 150 may wrap between approximately forty-five degrees (45°) and three-hundred-sixty-five degrees (365°) about the axis 104. For example, as shown in FIGS. 2-4, the controller 150 may wrap approximately one-hundred-eighty degrees (180°) about the axis 104.

As illustrated, the housing 152 may generally be arcuate (e.g., crescent-shaped) so as to extend about the axis 104 and to conform generally to the rounded profile of the turbocharger 100. The housing 152 may also be an outer shell-like member that is hollow and that encapsulates the internal components 154. In some embodiments, the housing 152 may be cooperatively defined by an outer housing body 155 and a cover 157 that covers over an open end of the outer housing body 155. The housing 152 may attach to the motor housing 118, for example on an inner radial area and/or on an axial face thereof.

Electrical connectors 151 may extend through the housing 152 for electrically connecting the internal components 154 to external systems. Furthermore, there may be openings for fluid couplings (e.g., couplings for fluid coolant). In some embodiments, there may be electrical connectors and fluid couplings that extend along a common direction (e.g., a single direction along the axis 104) to facilitate assembly of the turbocharger 100. Additionally, the controller housing 152 may define part of the exterior of the turbocharger 100. An outer surface 153 of the controller housing 152 may extend about the axis 104 and may face radially away from the axis 104. At least part of the outer surface 153 may be smoothly contoured about the axis 104, and at least part of the outer surface 153 may include one or more flat panels that are disposed tangentially with respect to the axis 104 at different angular positions. The outer surface 153 may be disposed generally at the same radius as the neighboring compressor housing 107 and/or turbine housing 106 as shown in FIG. 1. Accordingly, the overall size and profile of the turbocharger 100, including the controller 150, may be very compact.

The internal components 154 of the controller 150 may be housed within the controller housing 152. Also, at least some of the internal components 154 may extend arcuately, wrap about, and/or may be arranged about the axis 104 as will be discussed. Furthermore, as will be discussed, the internal components 154 may be stacked axially along the axis 104 in close proximity such that the controller 150 is very compact. As such, the integrated controller 150 may be compactly arranged and integrated with the turbine stage 130, the compressor stage 132, and/or other components of the turbocharger 100. Also, internal components 154 of the controller 150 may be in close proximity to the motor 116 to provide certain advantages. For example, because of this close proximity, there may be reduced noise, less inductance, etc. for more efficient control of the motor 116.

In addition to electronics components for electronic control of the motor 116, the controller 150 may include a number of components 154 that provide robust support. The controller 150 may also include components that provide efficient cooling. Thus, the turbocharger 100 may operate at extreme conditions due to elevated temperatures, mechanical loads, electrical loads, etc. Regardless, the controller 150 may be tightly integrated into the turbocharger 100 without compromising performance.

As shown in FIG. 2, the internal components 154 of the integrated controller 150 may include a coolant core 202. The coolant core 202 is shown in isolation in FIGS. 3 and 4 for clarity. As will be discussed, the coolant core 202 may be configured for supporting a number of electronics components, fastening structures, and other parts of the integrated controller 150. As such, the coolant core 202 may be referred to as a "support structure." The coolant core 202 may be fluidly-cooled, and as such, the coolant core 202 may be referred to as a "cooling plate, etc." The coolant core 202 may define one or more coolant passages through which a fluid coolant flows. As such, the coolant core 202 may receive a flow of a coolant therethrough for cooling the integrated controller 150.

The coolant core 202 may be elongate but curved and arcuate in shape and may extend in a tangential and/or circumferential direction about the axis 104. In other words, the coolant core 202 may wrap at least partially about the axis 104 to fit about the motor 116 of the turbocharger 100. Accordingly, the coolant core 202 may define an inner radial area 204 that faces the axis 104 and an outer radial area 206 that faces away from the axis 104. Moreover, the coolant core 202 may include a first axial end 208 and a second axial end 210, which face away in opposite axial directions. The first axial end 208 may face the compressor stage 132 of the turbocharger 100 in some embodiments and the second axial end 210 may face the turbine stage 130 in some embodiments. The coolant core 202 may also define an axial width 212, which may be defined parallel to the axis 104 between the first and second axial ends 208, 210. Additionally, the coolant core 202 may be semi-circular and elongate so as to extend circumferentially between a first angular end 231 and a second angular end 232, which are spaced apart angularly about the axis (e.g., approximately one-hundred-eighty degrees (180°) apart).

As shown in FIGS. 3 and 4, the coolant core 202 may be cooperatively defined by a plurality of parts, such as a reservoir body 214 and a cover plate 216. Both the reservoir body 214 and the cover plate 216 may be made from strong and lightweight material with relatively high thermal conductivity characteristics (e.g., a metal, such as aluminum). In some embodiments, the reservoir body 214 and/or the cover plate 216 may be formed via a casting process (e.g., high pressure die casting).

The cover plate 216 may be relatively flat, may be arcuate (e.g., semi-circular), and may lie substantially normal to the axis 104. Also, the cover plate 216 may define the first axial end 208 of the coolant core 202. The reservoir body 214 may be a generally thin-walled and hollow body with an open side 209 that is covered over by the cover plate 216 and a second side 211 that defines the second axial end 210 of the coolant core 202. The cover plate 216 may be fixed to the reservoir body 214 and sealed thereto with a gasket, seal, etc. One or more fasteners (e.g., bolts or other fasteners may extend axially through the cover plate 216 and the reservoir body 214 for attaching the same. The cover plate 216 and the reservoir body 214 may include one or more fastener holes 270 that receive a bolt or other fastener for attaching the first side electronics to the coolant core 202. Accordingly, the cover plate 216 and the reservoir body 214 may cooperate to define a fluid passage 220 that extends through the coolant core 202. In some embodiments, the fluid passage 220 may be elongate and may extend generally about the axis 104 from the first angular end 231 to the second angular end 232.

The coolant core 202 may also include at least one fluid inlet 222 to the fluid passage 220 and at least one fluid outlet 224 from the fluid passage 220. In some embodiments, for example, there may be a single, solitary inlet 222. The inlet 222 may be disposed proximate the first angular end 231 and may include a round, cylindrical, and hollow connector 223 that projects along the axis 104 from the cover plate 216 away from the first axial end 208. Also, in some embodiments, there may be a single, solitary outlet 224. The outlet 224 may be disposed proximate the second angular end 232 and may include a round, cylindrical, and hollow connector 226 that projects along the axis 104 from the cover plate 216 away from the first axial end 208.

The coolant core 202 may be fluidly connected to a coolant circuit 225, which is illustrated schematically in FIG. 1. The coolant circuit 225 may circulate any suitable fluid, such as a liquid coolant, between the fluid passage 220 and a heat exchanger 203 (FIG. 1). More specifically, coolant may flow from the inlet 222, through the fluid passage 220, to the outlet 224, thereby removing heat from the integrated controller 150, and may continue to flow through the heat exchanger 203 to be cooled before flowing back to the inlet 222 of the coolant core 202, and so on. Furthermore, as shown in FIG. 1, the heat exchanger 203 may, in some embodiments, be separate and fluidly independent of an engine coolant system 207 that cools the engine 125.

As shown in FIG. 4, the second axial end 210 of the coolant core 202 may include one or more inner apertures 240. The inner apertures 240 may include a plurality of pockets, recesses, receptacles, etc. that are open at the second side 211 of the reservoir body 214 and that are disposed proximate the inner radial area 204 of the core 202 in the radial direction. As shown, the inner apertures 240 may be generally cylindrical in some embodiments with circular profiles and with the longitudinal axis thereof arranged parallel to the axis 104. There may be a plurality of inner apertures 240 arranged at different angular positions with respect to the axis 104 along the inner radial area 204 of the core 202. The size and shape of the inner apertures 240 may correspond to certain ones of the internal components 154 of the integrated controller 150. For example, the inner apertures 240 may be cylindrical, as shown, to receive and support inner electronics components, such as a series of capacitors 241 (FIG. 2) of the controller 150. Furthermore, as shown in FIGS. 3 and 4, the reservoir body 214 may define the apertures 240 with relatively thin walls 245 or other structures that separate the capacitors 241 within the apertures 240 from the coolant within the fluid passage 220. Accordingly, the capacitors 241 may be effectively cooled by the coolant circuit 225.

Likewise, as shown in FIG. 4, the second side 211 of the reservoir body 214 may include a second side aperture 246 that has an ovate profile and that is recessed in the axial direction into the reservoir body 214. The second side aperture 246 may be arranged with the major axis of its ovate shape extending tangentially with respect to the axis 104. Also, the minor axis may extend radially and may be large enough to extend over both the inner radial area 204 and the outer radial area 206 of the coolant core 202. Furthermore, the second side aperture 246 may be shaped correspondingly to another electronics component, such as an inverter, capacitor, a battery, or another piece of control equipment.

Additionally, the outer radial area 206 of the coolant core 202 may extend about the axis 104 and may include one or more outer seats 219. The seats 219 may be rectangular and may lie in a respective tangential plane with respect to the axis 104. The seats 219 may be disposed and spaced apart circumferentially at different angular positions with respect to the axis 104. Furthermore, seats 219 may include a respective outer aperture 250 extending radially through to the interior of the core 202. In some embodiments, at least one outer aperture 250 may be a rectangular hole that is centered within the respective seat 219 and that passes through the reservoir body 214 to the fluid passage 220 therein. The seat 219 may include the rectangular rim of the respective aperture 250.

These outer apertures 250 may be sized and configured to receive an outer electronics component 251 (FIG. 2). This component 251 may be and/or may include a semiconductor circuit component, such as a substantially-flat and rectangular transistor 253. The transistor 253 may be a circuit component, switch component, MOSFET transistor, or another type.

The transistor 253 may be seated on a respective one of the seats 219. The transistor 253 may be partially received in one of the apertures 250 and may be supported and mounted on a respective seat 219 so as to cover over the respective outer aperture 250. There may be a gasket or other sealing member that seals the transistor 253 to the seat 219. Also, the transistor 253 may include one or more thermally-conductive projections 254 (FIG. 2), such as an array of fins, rails, posts, pins, etc.) that project from an underside thereof to extend into the fluid passage 220. Accordingly, coolant within the coolant circuit 225 may flow across the projections 254 to provide highly effective cooling to the transistor 253.

The first axial end 208 of the core 202 (defined substantially by the cover plate 216) may provide a seat 257 (i.e., a second seat) for mounting and supporting a first side electronics package 260 of the controller 150. The seat 257 may include one or more axially-facing surfaces of the first axial end 208. The seat 257 may be planar and/or may include a plurality of co-planar surfaces that are spaced apart across the first axial end 208. The seat 257 may include one or more surfaces on the end 208 that are arranged and/or that extend about the axis 104.

The first side electronics package 260 is represented schematically in FIG. 2 as a semi-circular body that corresponds generally to the shape of the coolant core 202. One or more parts of the first side electronics package 260 may be arcuate, may be elongate but extend about the axis 104, or may otherwise extend about the axis 104. The first side electronics package 260 may include at least one bus bar. The bus bar may be elongate and may extend about the axis 104. The first side electronics package 260 may also include an arcuate circuit board assembly, an arcuate stiffening plate, fasteners, and/or other components arranged about the axis 104. The bus bar and/or other components of the first side electronics package 260 may be attached to the first axial end 208 of the core 202 in any suitable fashion, such as fasteners. Accordingly, the first side electronics package 260 may be in close proximity with the coolant core 202 such that the coolant core 202 may absorb heat therefrom with high efficiency and effectiveness.

As represented in FIG. 2, the second axial end 210 of the coolant core 202 may provide a seat 282 (i.e., a third seat) for mounting and supporting a second side electronics package 262 of the integrated controller 150. Like the first side electronics package 260, the second side electronics package 262 is represented schematically in FIG. 2. The second side electronics package 262 may include at least one bus bar that is elongate and that extends about the axis 104. The second side electronics package 262 may also include an arcuate circuit board assembly, an arcuate stiffening plate, fasteners, and/or other components arranged about the axis 104, and at least some of these components may be similarly stacked in the axial direction. The second side electronics package 262 may be attached to the second axial end 210 of the core 202 in any suitable fashion, such as fasteners. Accordingly, the second side electronics package 262 may be in close proximity with the coolant core 202 such that the coolant core 202 may absorb heat therefrom with high efficiency and effectiveness.

The fluid passage 220 for the coolant within the coolant core 202 may be defined between the inner surfaces of the reservoir body 214, the inner face of the cover plate 216, and the inner faces of the transistors 253. The fluid passage 220 may also extend arcuately about the axis 104, from the inlet 222 to the outlet 224. Coolant may enter via the inlet 222, flow generally from the first angular end 231 to the second angular end 232 and exit via the outlet 224. Accordingly, the coolant may flow in close proximity and across the core-facing surfaces of the transistors 253, the capacitors 241, the first side electronics package 260, and the second side electronics package 262.

Accordingly, the controller 150 may be integrated and packaged among the turbine stage 130, the motor 116, and/or the compressor stage 132 of the turbocharger 100. The coolant core 202 and the coolant circuit 225 may provide effective cooling despite compact packaging of these components. Moreover, the controller 150 may be robustly supported.

Figure 5:
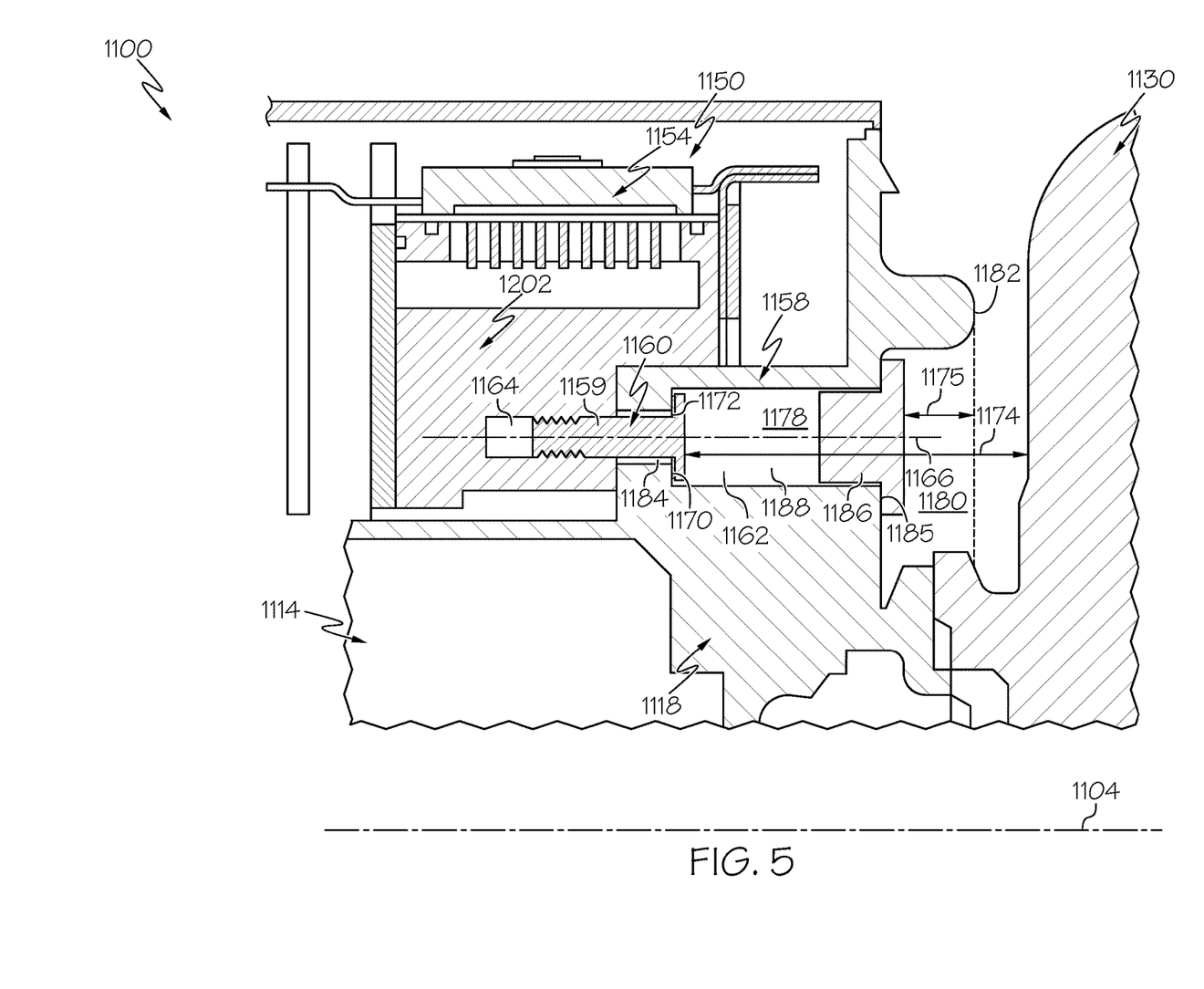
FIG. 5 is a section view of a fastener arrangement of the integrated controller according to example embodiments of the present disclosure.

Referring now to FIG. 5, additional details of the present disclosure will be discussed. The embodiments illustrated in FIG. 5 may correspond to at least one of those discussed above in relation to FIGS. 1-4. Components in FIG. 5 that correspond to those of FIGS. 1-4 are identified with corresponding reference numbers increased by 1000. For purposes of brevity, those details included above will not be repeated.

The turbocharger 1100 may include the e-machine 1114 with the motor housing 1118. The turbocharger 1100 may further include the integrated controller 1150 that has the coolant core 1202 and the internal components 1154 supported thereon as discussed above. The turbocharger 1100 may include a turbomachine stage, such as the turbine stage 1130 discussed above. Similar to the embodiments of FIG. 1, the turbocharger 1100 may further include a compressor stage, and in some embodiments, the e-machine 1114 and controller 1150 may be disposed axially between the turbine stage 1130 and the compressor stage relative to the axis of rotation 1104 of the rotating group.

The turbocharger 1100 may further include a thermally decoupled fastener arrangement 1158 that attaches the coolant core 1202 of the integrated controller 1150 to the motor housing 1118. The fastener arrangement 1158 also thermally de-couples the coolant core 1202 from the turbine stage 1130.

For example, the fastener arrangement 1158 may include one or more fasteners 1159, such as bolts, screws, or other threaded fasteners, that are received in respective fastener apertures 1160. At least one fastener aperture 1160, as shown in FIG. 5, may include a motor housing portion 1162 and a coolant core portion 1164, which may be aligned along a fastener axis 1166. The fastener axis 1166 may be substantially parallel to the axis of rotation 1104 of the rotating group. In some embodiments, the coolant core portion 1164 may be a blind hole or a through-hole with a substantially constant diameter and with an internal threading. The motor housing portion 1162 may be a through-hole with a diameter that varies along its length. The motor housing portion 1162 may be disposed proximate an outer, radial flange 1181 of the motor housing 1118. The motor housing portion 1162 of the aperture 1160 may include a first end 1180 that extends through an outer axial face 1182 of the motor housing 1118. The motor housing portion 1162 may also include a second end 1184 that has a smaller diameter than the first end 1180. Furthermore, the motor housing portion 1162 may include an intermediate segment 1188 that is disposed axially between the first end 1180 and the second end 1184 and that has a diameter less than that of the first end 1180 and greater than that of the second end 1184. The motor housing portion 1162 also includes a fastener seat 1170 that is recessed into the outer axial face 1182 of the motor housing 1118 facing the turbine stage 1130. The head of the fastener 1159 may be seated on the fastener seat 1170 and may be threadably attached within the coolant core portion 1164 to attach the motor housing 1118 to the coolant core 1202. In some embodiments, the fastener arrangement 1158 may include at least one washer 1172 (e.g., a spring washer) or other similar component for seating and securing the attachment of the fastener 1159. It will be appreciated that there may be a plurality of fasteners 1159 received in respective fastener apertures 1160, for example, spaced apart equally in the circumferential direction about the axis 1104.

As shown in FIG. 5, the fastener seat 1170 is recessed axially from the axial face 1182 of the motor housing 1118. This allows the head of the fastener 1159 to be spaced apart at a distance 1174 from the opposing face of the turbine stage 1130. This distance 1174 limits or inhibits heat transfer from the turbine stage 1130 to the fastener 1159 and, thus, may thermally decouple the turbine stage 1130 from the fastener 1159. Accordingly, the fastener 1159 is less likely to receive radiative or other heat transferred from the turbine stage 1130.

The fastener arrangement 1158 may further include at least one heatshield covering 1186. As shown in FIG. 5, there may be at least one heatshield covering 1186 that is rounded and cap-shaped. The heatshield covering 1186 may be made from and/or may include material that has a relatively low heat transfer coefficient (i.e., thermally insulative material such as a polymeric material).

The heatshield covering 1186 may be received within the intermediate segment 1188 and a flange of the covering 1186 may be seated on a heatshield seat 1185 at a transition between the intermediate segment 1188 and the first end 1180 of the fastener aperture 1160. The heatshield seat 1185 may be recessed from the face 1182 of the motor housing 1118, away from the turbine stage 1130. This allows the heatshield covering 1186 to be spaced apart at a distance 1175 from the opposing face of the turbine stage 1130. This distance 1175 limits or inhibits heat transfer from the turbine stage 1130 to the heatshield covering 1186 and, thus, may thermally decouple the turbine stage 1130 from the fastener 1159. Accordingly, the fastener 1159 is less likely to receive radiative or other heat transferred from the turbine stage 1130 and otherwise heat the internal components 1154 of the integrated controller 1150.

The heatshield covering 1186 and may cover over and close off the fastener aperture 1160. Also, the heatshield covering 1186 may be disposed axially between the fastener 1159 and the turbine stage 1130 to thereby cover over the respective fastener 1159 and protect it from heat radiating from the turbine stage 1130. Additionally, the intermediate segment 1188 may include an airgap 1178 between the heatshield covering 1186 and the fastener 1159. This airgap 1178 may provide additional thermal insulation from heat transferring from the turbine stage 1130 to the integrated controller 1150. It will be appreciated that there may be a plurality of heatshield coverings 1186 for the number of fastener apertures 1160 included, for example, spaced apart equally in the circumferential direction about the axis 1104.

Accordingly, the fastener arrangement 1158 may protect the integrated controller 1150 from excessive heating and maintain thermal conditions within a predetermined range for effective and efficient operation of the turbocharger 1100. Furthermore, the fastener arrangement 1158 may be installed quickly and easily with relatively few parts or processing steps. For example, the apertures 1160 may be formed using a cutting tool, such as a mill. Also, the fasteners 1159 may be highly available fasteners that may be installed quickly and easily. Then, the heatshield coverings 1186 may be attached, for example, manually by pressing the coverings 1186 onto the heatshield seats 1185.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A turbomachine comprising:
a housing;
a rotating group that is supported for rotation about an axis of rotation within the housing;
a turbomachine stage including a wheel of the rotating group that is supported within a turbomachine housing of the housing;
an e-machine section including an e-machine that is housed within an e-machine housing of the housing, the e-machine being operably coupled to the rotating group and configured to operate as at least one of a motor and a generator;
an integrated controller that extends in a circumferential direction about the axis of rotation, the integrated controller configured for controlling the e-machine;
a thermally decoupled fastener arrangement that attaches the integrated controller to the e-machine housing, the fastener arrangement thermally decoupling the integrated controller from the turbomachine stage;
the e-machine housing including an outer face that faces the turbomachine housing and a fastener seat within a fastener aperture in the e-machine housing, the fastener seat recessed from the outer face; and
the fastener arrangement including a fastener that is seated on the fastener seat and disposed within the fastener aperture to be separated at a distance from the turbomachine housing.

2. The turbomachine of claim 1, wherein the turbomachine stage is a turbine stage, the wheel being a turbine wheel, and the turbomachine housing being a turbine housing; and
wherein the fastener arrangement thermally decouples the integrated controller from the turbine stage.

3. The turbomachine of claim 2, further comprising a compressor stage including a compressor wheel of the rotating group that is supported within a compressor housing of the housing.

4. The turbomachine of claim 1, further comprising a heatshield covering that closes off the aperture and that is disposed between the turbomachine stage and the fastener to limit heat transfer from the turbomachine stage to the fastener.

5. The turbomachine of claim 4, wherein the aperture includes a heatshield seat that is recessed from the outer face; and
wherein the heatshield covering is seated on the heatshield seat and disposed within the fastener aperture to be separated from the turbomachine housing.

6. The turbomachine of claim 5, further comprising an air gap between the heatshield covering and the fastener head.

7. The turbomachine of claim 1, wherein the integrated controller includes an electronics component and a support structure that supports the electronics component, the support structure including a fluid passage configured to receive a flow of fluid coolant for cooling the electronics component.

8. The turbomachine of claim 1, wherein the fastener arrangement includes a fastener that extends along a fastener axis that is substantially parallel with the axis of rotation.

9. The turbomachine of claim 1, wherein the fastener arrangement includes a plurality of fasteners that are received in a corresponding plurality of fastener through-holes in the e-machine housing to fasten to the support structure, the plurality of fasteners being spaced apart from the turbomachine stage; and
wherein the fastener arrangement includes a plurality of heat shield coverings that respectively close off the plurality of fastener through-holes and that block heat transfer from the turbomachine stage to the plurality of fasteners.

10. A method of manufacturing a turbomachine comprising:
supporting a rotating group for rotation about an axis of rotation within a housing, including defining a turbomachine stage that includes a wheel of the rotating group supported within a turbomachine housing of the housing;
housing an e-machine within an e-machine housing of the housing to define an e-machine section, including operatively coupling the e-machine to the rotating group for operation as at least one of a motor and a generator, the e-machine housing including an outer face that faces the turbomachine housing;
extending an integrated controller in a circumferential direction about the axis of rotation, the integrated controller configured for controlling the e-machine;
attaching the integrated controller to the e-machine housing with a thermally decoupled fastener arrangement, the fastener arrangement thermally decoupling the integrated controller from the turbomachine stage;
forming a fastener seat within a fastener aperture in the e-machine housing, the fastener seat recessed from the outer face; and
seating a fastener of the fastener arrangement on the fastener seat and disposing the fastener within the fastener aperture to be separated at a distance from the turbomachine housing.

11. The method of claim 10, wherein the turbomachine stage is a turbine stage, the wheel being a turbine wheel, and the turbomachine housing being a turbine housing; and
wherein the fastener arrangement thermally decouples the integrated controller from the turbine stage.

12. The method of claim 11, further comprising defining a compressor stage including a compressor wheel of the rotating group that is supported within a compressor housing of the housing.

13. The method of claim 10, further comprising providing the fastener arrangement with a heatshield covering, including closing off the aperture with the heatshield covering, and disposing the heatshield covering between the turbomachine stage and the fastener to limit heat transfer from the turbomachine stage to the fastener.

14. The method of claim 13, further comprising forming a heatshield seat in the aperture, the heatshield seat being recessed from the outer face; and
further comprising seating the heatshield covering on the heatshield seat, and disposing the heatshield covering within the fastener aperture to be separated from the turbomachine housing.

15. The method of claim 14, further comprising providing an air gap between the heatshield covering and the fastener head.

16. The method of claim 10, wherein the integrated controller includes an electronics component and a support structure that supports the electronics component, the support structure including a fluid passage configured to receive a flow of fluid coolant for cooling the electronics component.

17. The method of claim 10, wherein attaching the integrated controller to the e-machine housing includes extending a fastener along a fastener axis that is substantially parallel with the axis of rotation.

18. A turbomachine comprising:
a housing;
a rotating group that is supported for rotation about an axis of rotation within the housing;
a turbomachine stage including a wheel of the rotating group that is supported within a turbomachine housing of the housing;
an e-machine section including an e-machine that is housed within an e-machine housing of the housing, the e-machine being operably coupled to the rotating group and configured to operate as at least one of a motor and a generator;
an integrated controller that extends in a circumferential direction about the axis of rotation, the integrated controller configured for controlling the e-machine;
a thermally decoupled fastener arrangement that attaches the integrated controller to the e-machine housing, the fastener arrangement thermally decoupling the integrated controller from the turbomachine stage;
the fastener arrangement including a plurality of fasteners that are received in a corresponding plurality of fastener through-holes in the e-machine housing to fasten to the support structure, the plurality of fasteners being spaced apart from the turbomachine stage; and
the fastener arrangement including a plurality of heat shield coverings that respectively close off the plurality of fastener through-holes and that block heat transfer from the turbomachine stage to the plurality of fasteners.

19. The turbomachine of claim 18, wherein the turbomachine stage is a turbine stage, the wheel being a turbine wheel, and the turbomachine housing being a turbine housing; and
wherein the fastener arrangement thermally decouples the integrated controller from the turbine stage.

20. The turbomachine of claim 19, further comprising a compressor stage including a compressor wheel of the rotating group that is supported within a compressor housing of the housing.

* * * * *